United States Patent [19] [11] 3,926,061

Paulson [45] Dec. 16, 1975

[54] DIFFERENTIAL DRIVE ROTATING DISC IMPACT PRINTER

[75] Inventor: Gary L. Paulson, Loveland, Colo.

[73] Assignee: Hewlett-Packard Company, Palo Alto, Calif.

[22] Filed: Oct. 2, 1974

[21] Appl. No.: 511,339

[52] U.S. Cl..................... 74/22 R; 74/22 A; 74/225; 74/422; 197/55; 197/82

[51] Int. Cl.$^{2}$... F16H 21/00; F16H 7/00; B41J 1/32; B41J 19/00

[58] Field of Search.......... 74/22 R, 22 A, 225, 422; 197/60, 55, 52, 48, 82

[56] References Cited

UNITED STATES PATENTS

| | | | |
|---|---|---|---|
| 2,905,302 | 9/1959 | Hickerson | 197/52 |
| 3,493,090 | 2/1970 | Liles | 197/52 X |
| 3,532,204 | 10/1970 | Sasaki | 197/82 X |
| 3,572,489 | 3/1971 | Schaefer | 197/82 |
| 3,861,511 | 1/1975 | Nelson et al. | 197/52 X |
| 3,866,735 | 2/1975 | Decker | 197/55 |

*Primary Examiner*—Leonard H. Gerin
*Attorney, Agent, or Firm*—Ronald E. Grubman

[57] ABSTRACT

A drive system is provided in which a pair of fixedly mounted motors imparts simultaneous and independent rotational and translational motion to a disc such as a print disc containing a character font. By means of a belt and pulley system, different rotations of the two motors produce different combinations of rotational and translational motions of the disc. The system may also drive elements other than a disc, e.g., a bar and pen arrangement such as that typically employed in an X–Y plotter.

A related mechanical system is also disclosed in which translational motion of a pair of rack gears provides simultaneous and independent rotation and translation to a pinion gear. The driving translational motion may also be supplied by a pair of independent belt drives moving parallel or antiparallel to each other.

8 Claims, 8 Drawing Figures

DIFFERENTIAL DRIVE ROTATING DISC IMPACT PRINTER

BACKGROUND OF THE INVENTION

This invention relates generally to serial printers and more particularly to a differential drive mechanism for rotating and translating a print disc.

Numerous serial printers known in the art employ a circular print disc positioned parallel to the plane of a surface to be printed and containing a character font disposed at angular increments around the face of the disc. Typically the print disc is attached to a moving print head which is translationally driven parallel to the line being printed. An increment of translational distance corresponds to a column of printing. In order to produce any particular desired character the print disc is rotated to the angular position corresponding to that character.

In devices known in the art the translational motion of the print head is provided by a first motor, while the rotational motion of the print disc is typically provided by a second smaller motor mounted on the moving print head itself. Thus, the translational motor must be sufficiently large to drive not only the print disc but the rotational motor mounted on the head. Substantial extra power is therefore consumed in transporting the rotational motor to and fro while printing.

SUMMARY OF THE INVENTION

In accordance with the illustrated preferred embodiments the present invention provides a differential drive system in which a pair of identical fixedly mounted motors provides both translational and rotational motion to a print disc. The motors are mounted on a fixed frame of the printer and linked to the rotating print disc by a continuous belt. Rotation of the motors at identical rates in opposite directions provides a pure translational motion of the disc. Rotation of the motors at identical rates in the same direction provides pure rotational motion of the disc. By varying the rates and direction of the motors, combined translational and rotational motion of the disc may be obtained.

In accordance with another embodiment of the invention the differential drive may supply the two translational motions required for an X–Y plotting instrument.

In accordance with yet another embodiment of the invention a mechanical pinion gear is mounted for rotation and translation between two identical rack gears positioned for parallel translation one to the other.

In accordance with still another embodiment of the invention driving translational motion is imparted to a pinion-like element by two independent belts moving parallel or antiparallel to each other.

DESCRIPTION OF THE INVENTION

Figures 1, 2:
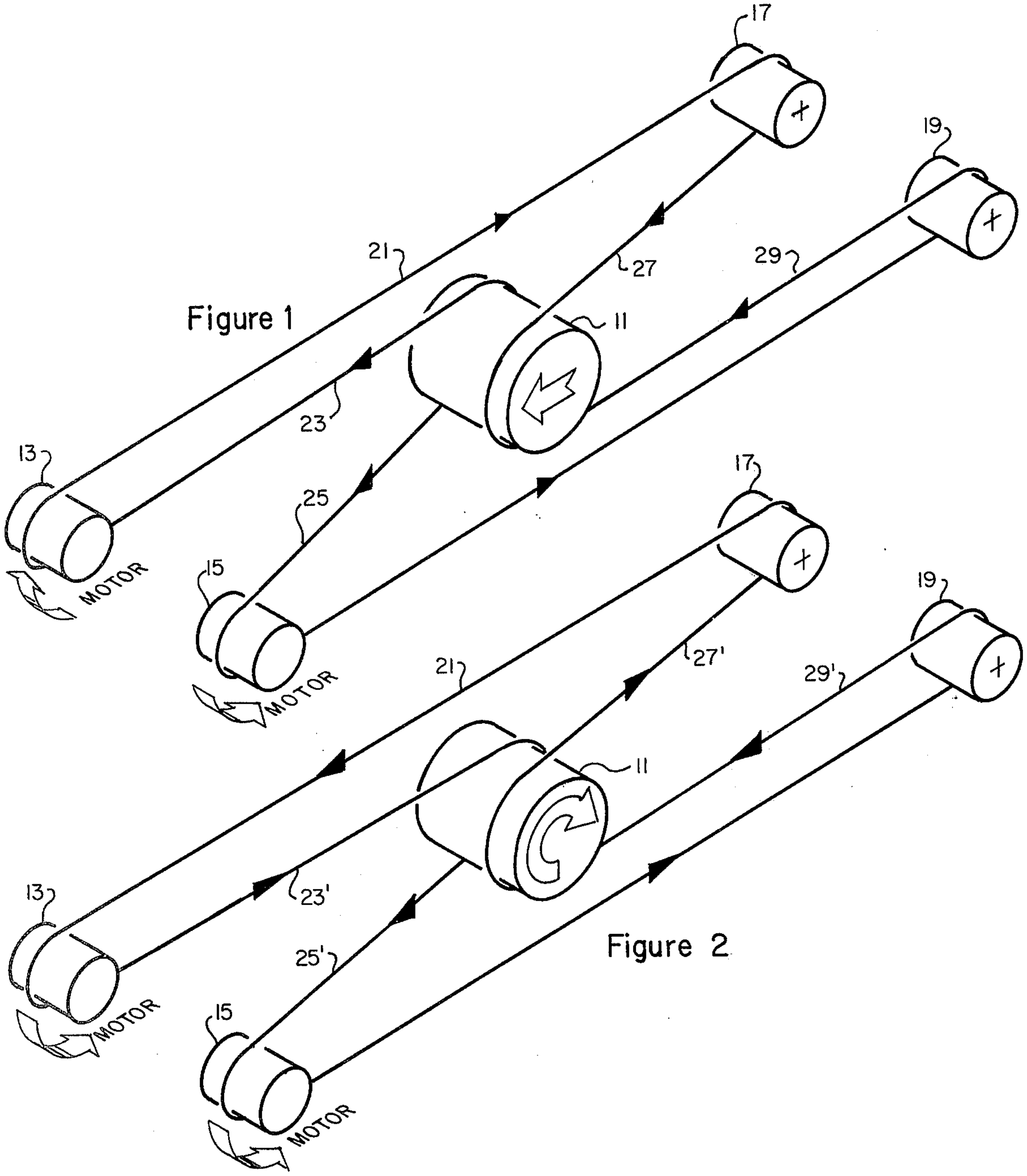
FIG. 1 illustrates a drive system according to the invention. In the mode shown, rotation of a pair of motors produces a pure translation of a cylinder.
FIG. 2 illustrates a mode in which rotation of the motors produces a pure rotation of the cylinder.

In FIG. 1 there is illustrated a cylindrical-like element 11 to which it is desired to impart both rotational and translational motion, e.g., an element to which a rotating print disc is attached in serial printers. Element 11 is adapted for operation responsive to a pair of belt elements, and may therefore comprise, e.g., a pair of connected sprockets or pulleys or a drum-like surface or other suitable structure. Two drive units or motors 13 and 15 are schematically illustrated and positioned remote from cylinder 11. In connection with a printer e.g., motors 13 and 15 may be mounted on the printer chassis. Conventional stepping motors have been found to be particularly suitable for use on printers, but other motors such as DC's or AC servo motors may also be employed. Also illustrated in FIG. 1 are two passive rotational elements 17 and 19 which may be e.g., pulleys. In a printer these elements may also be chassis mounted and remote from printing disc 11. Cylinder 11 is linked to motors 13 and 15 by means of a belt 21 which is preferably a cog belt. It is evident that other linking drives such as a non-slipping band, a cable, a chain, or a timing belt may also be employed.

FIG. 1 illustrates a mode of operation of the invention in which cylinder 11 undergoes a pure translational motion (indicated by a fat arrow therein) in response to rotation of motors 13 and 15. By way of explanation, two arc-like arrows adjacent motors 13 and 15 are meant to indicate that these motors are rotating at equal rates but in opposite directions. According to the invention, these motor rotations will induce motion of cylinder 11 by means of the continuous linking belt 21 which is specially positioned with respect to motors 13 and 15, pulleys 17 and 19, and cylinder 11. The physical arrangement of the belt is best described simply by observation of the figure itself. It will be apparent from the subsequent discussion of the operation of the device that numerous rearrangements of the elements are possible in the spirit of the invention. For example, any or all of the motors or pulleys may be rotated out of the plane of the drawing, in which case one or more twists must be introduced in belt 21. Other physical placements are also possible and will be evident to those skilled in the art. To facilitate understanding of the invention, belt 21 has been arbitrarily divided into numerous sections. For example, since motors 13 and 15 are rotating in opposite directions at identical angular velocities, the two sections of the belt labeled 23 and 25 must each be moving to the left at identical linear velocities (the direction of motion is indicated by the arrows on those sections). Since there is no slack in the belt the two sections labeled 27 and 29 must also be moving toward the left at identical velocities. Belt 21 therefore supplies no net torque to cylinder 11 so that there will be no rotational motion whatsoever of the disc. Instead, the cylinder will simply undergo a translational motion to the left. Translation of the disc in the opposite direction may be effected by reversing the direction of each motor rotation. In the context of a printer, the invention provides a very rapid carriage return of the print disc, since the pure translation is then provided by both motors.

In FIG. 2 motors 13 and 15 are illustrated as rotating at equal angular velocities but in the same direction, as indicated by the two adjacent arc-like arrows. Thus, belt portion 23' will be moving away from the motors to the right at a particular linear velocity while portion 25' will be moving to the left at that same speed. By tracing the belt path around cylinder 11 and pulleys 17 and 19, it can be seen that belt portions 27' and 29' are moving to the right and left respectively at equal speeds. There is thus no net translational force on cylinder 11. However, as the belts wrap around the disc, a pure rotation in a clockwise direction will be imparted as indicated by the fat arrow drawn in cylinder 11.

Figure 3:
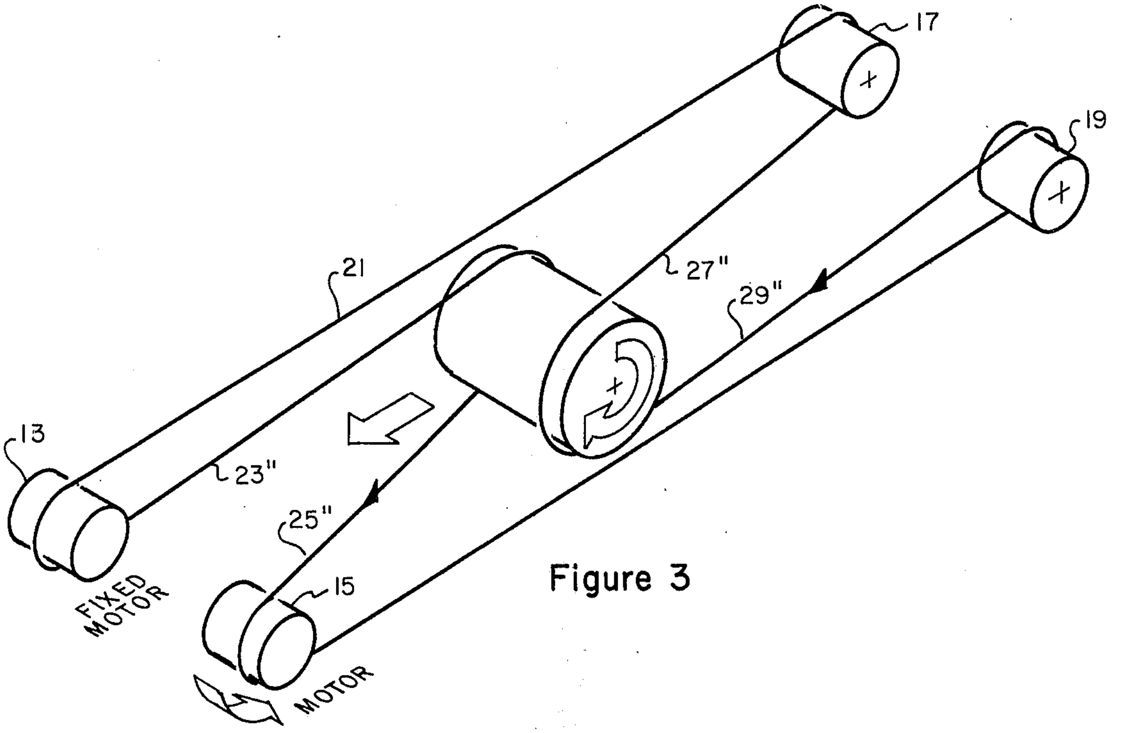
FIG. 3 shows one way in which a combined rotational and translational motion of the cylinder may be provided in accordance with the invention.

In the above discussion, motors 13 and 15 were taken to be rotating at equal angular speeds. Pure rotation or translation was thereby imparted to cylinder 11. If the motors are rotated at unequal rates, cylinder 11 will instead undergo a combination rotational and translational motion. Thus, in connection with use in printers a print disc may be rotated to the appropriate character while simultaneously undergoing translation to the next desired column location for printing. FIG. 3 illustrates a motion which is one particular combination of rotational and translational motion. In FIG. 3 motor 13 is taken to be nonrotating. Motor 15 is illustrated as rotating counter-clockwise. Thus, belt section 23'' is stationary as is section 27''. Section 25'', however, is moving to the left as is section 29''. The net translational force on cylinder 11 will impart a translational motion to the left to cylinder 11. The net torque imparted by the belts will simultaneously impart a clockwise rotation to the disc. In effect cylinder 11 will roll along belt sections 23 and 27 which (while stationary) will become shortened and elongated respectively.

Figure 4:
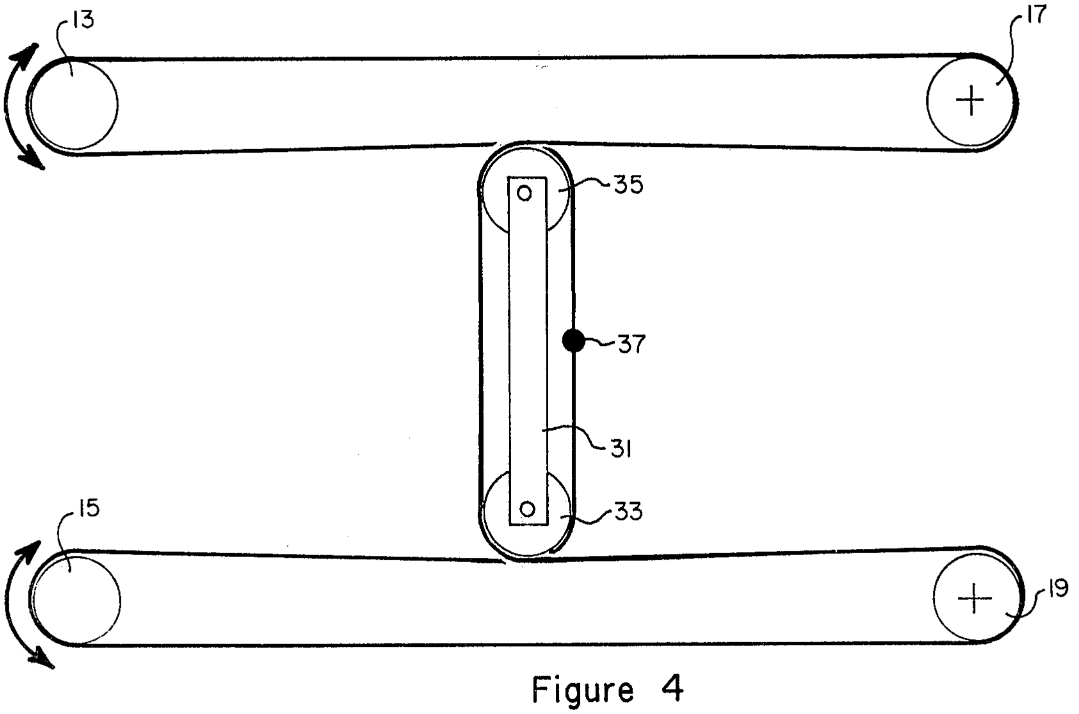
FIG. 4 illustrates a differential drive system employed in an X–Y plotter arrangement.

In FIG. 4 a pair of motors 13 and 15 are again illustrated as are two pulleys 17 and 19. However, print cylinder 11 has been replaced by an elongated parallel bar 31 having additional pulleys 33 and 35 mounted at its ends. Belt 21 wraps around pulleys 33 and 35. A print instrument such as a pen 37 is fixedly connected to a portion of belt 21. This pen and bar arrangement is typical of plotting devices such as an X–Y plotter known in the art.

By applying the principles discussed above in connection with FIGS. 1–3, the motions of pen 37 and bar 31 are readily apparent. For example, if motors 13 and 15 are rotated at equal rates in opposite directions bar 31 will be translated to the left while there will be no motion of pen 37. If on the other hand both motors are rotated in a counter-clockwise direction at equal rates pen 37 will move in a downward direction (i.e., the belt will wrap counter-clockwise around pulleys 33 and 35). Different combinations of motor speed and directions of rotation will result in different combinations of bar motion and pen motion. Thus, the differential drive mechanism according to the present invention may also provide a drive for an X–Y type plotter.

Figure 5A:
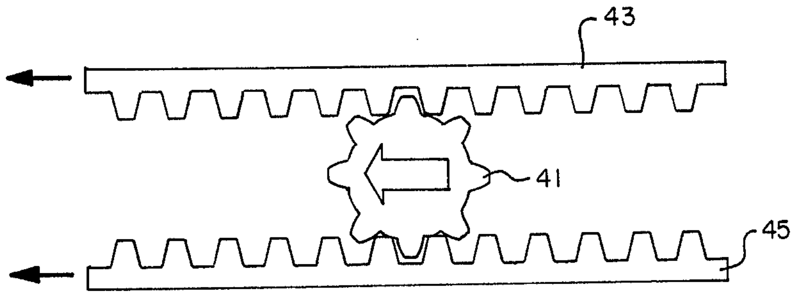
FIGS. 5*a–c* illustrate a mechanical system in which translation of a pair of rack gears imparts translation and rotation to a pinion.
Figure 5B:
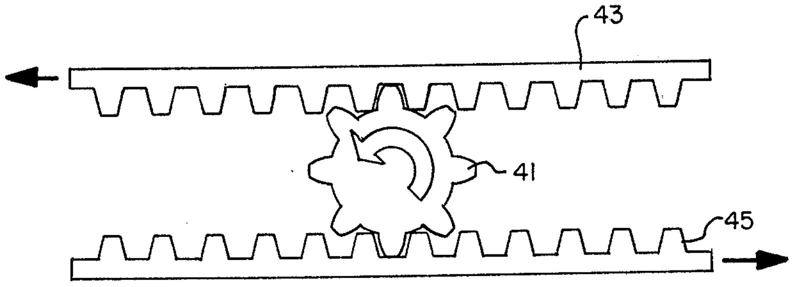
Figure 5C:
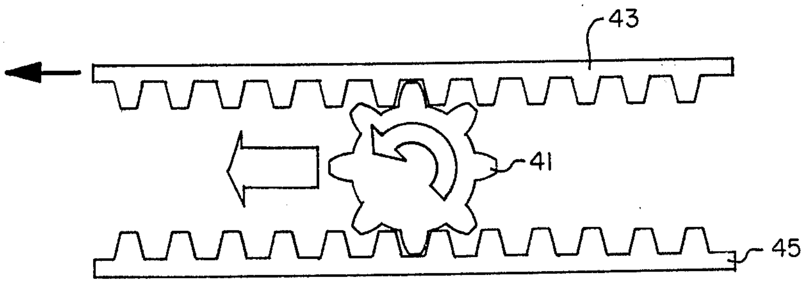

In FIG. 5*a* a mechanical analog of the belt system of the present invention is illustrated. A circular gear or pinion 41 is positioned in geared engagement with two parallel mounted rack gears 43 and 45. Pinion 41 is free to undergo either translational or rotational motion. If both rack gears are translated to the left as indicated by the arrows pinion 41 will be simply translated along with the racks. However, if rack 43 is translated to the left while rack 45 is translated to the right as illustrated in FIG. 5*b* a pure counter-clockwise rotation of pinion 41 will result. In FIG. 5*c* rack gear 45 is stationary while rack 43 is translated to the left. In this mode pinion 41 will roll to the left along rack 45; i.e., pinion 41 will undergo a combination translational and rotational motion. Different motions may be obtained by translating the racks at different speeds and in different directions.

Figure 6:
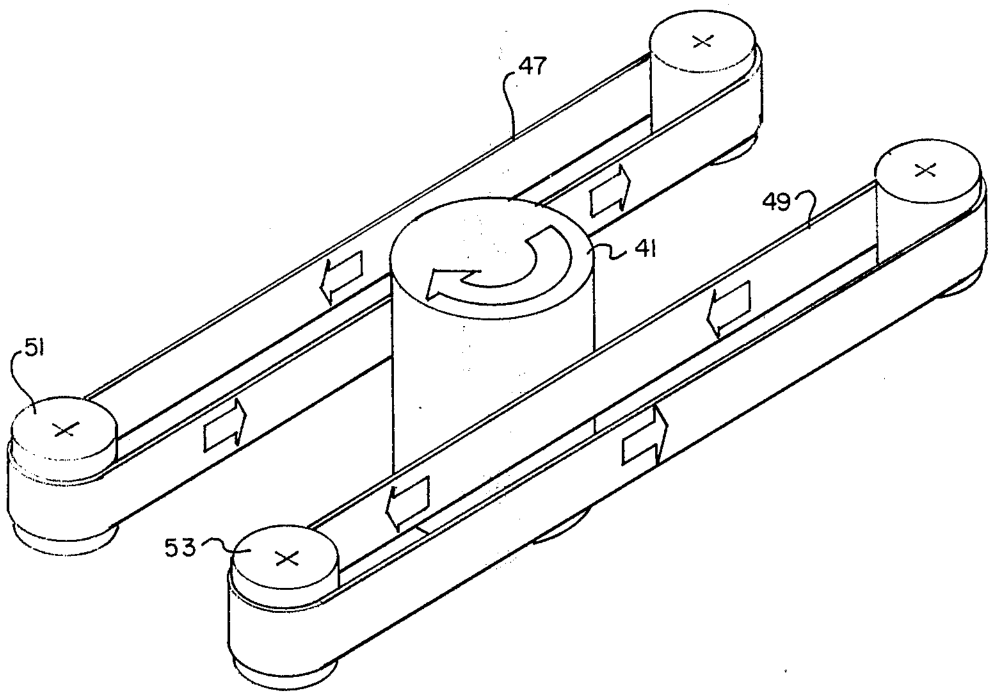
FIG. 6 shows a system of two belts moving parallel or antiparallel to each other to impart rotation and translation to a movable element.

FIG. 6 illustrates another embodiment in which the driving translational motion is provided by a pair of independent belt and pulley systems 47 and 49. Each belt is driven by a motor labeled 51 and 53 respectively to provide independent translational motion to the belt, and in effect operates as a "flexible" rack gear. In the illustrated operating mode belts 47 and 49 are moving at equal speeds in opposite directions. Cylinder 41 responds with a pure rotation clockwise. Other motions are obtained as described above in connection with FIG. 5.

I claim:

1. A differential drive system comprising:
- a support;
- first and second drive means fixedly mounted on said support for providing rotational motion;
- moving means movably positioned for rotational and translational motion with respect to said support; and
- linking means interconnected between said first and second drive means and said moving means for transmitting forces and torques therebetween, said moving means thereby undergoing motion having rotational and translational components whose magnitudes and directions depend on the relative magnitudes and directions of the rotational motions of said first and second drive means.

2. A differential drive system as in claim 1 wherein:
- said first and second drive means comprise a pair of substantially identical motors; and
- said linking means comprises a continuous belt linking said first and second drive means and said moving means.

3. A differential drive system as in claim 2 wherein said moving means comprises a cylinder movably positioned for rotational and translational motion.

4. A differential drive system as in claim 3 wherein:
- said linking means further comprises a pair of pulleys; and
- said continous belt engages one of said pair of motors and one of said pair of pulleys, thence engaging a portion of the perimeter of said cylinder in one direction, thence engaging the other of said pulleys and the other of said motors, and again engaging another portion of the perimeter of said disc in another direction opposite said one direction.

5. A differential drive system as in claim 2 wherein said moving means comprises:
- a bar movably mounted for translation along a first axis;
- a pair of pulleys mounted on said bar for engagement with said continuous belt; and
- an additional member affixed to said continuous belt adjacent said bar for rotation about said bar producing in part a translation along a second axis perpendicular to said first axis.

6. A differential drive system comprising:
- a support;
- first and second drive means mounted for substantially parallel or antiparallel translational motion therebetween;

moving means interconnected with said first and second drive means and movably positioned for rotational and translational motion with respect to said support, said moving means undergoing motion having rotational and translational components whose magnitudes and directions depend on the relative magnitude and direction of the translational motion between said drive means.

7. A differential drive system as in claim 6 wherein:
said first and second drive means comprise first and second rack gears; and
said moving means comprises a pinion gear mounted in geared relation between said rack gears.

8. A differential drive system as in claim 6 wherein:
said first and second drive means comprise first and second rotational drive means; and
first and second belt means interconnected with said first and second rotational drive means respectively for providing substantially parallel or antiparallel translational motion between said first and second belt means.

* * * * *

UNITED STATES PATENT AND TRADEMARK OFFICE

CERTIFICATE OF CORRECTION

PATENT NO. : 3,926,061

DATED : December 16, 1975

INVENTOR(S) : Gary R. Paulson

It is certified that error appears in the above-identified patent and that said Letters Patent are hereby corrected as shown below:

In the title page, column 1, the Inventor's name should read -- Gary R. Paulson --.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*